United States Patent
Kwon et al.

(10) Patent No.: US 9,821,664 B2
(45) Date of Patent: Nov. 21, 2017

(54) SYSTEM AND METHOD FOR EMERGENCY STARTING OF FUEL CELL VEHICLE

(71) Applicant: Hyundai Motor Company, Seoul (KR)

(72) Inventors: Sang Uk Kwon, Gyeonggi-do (KR); Kyung Won Suh, Seoul (KR); Nam Woo Lee, Gyeonggi-do (KR); Dae Jong Kim, Gyeonggi-do (KR); Soon Il Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 706 days.

(21) Appl. No.: 14/047,266

(22) Filed: Oct. 7, 2013

(65) Prior Publication Data
US 2014/0368028 A1    Dec. 18, 2014

(30) Foreign Application Priority Data

Jun. 13, 2013 (KR) .................. 10-2013-0067698

(51) Int. Cl.
| | |
|---|---|
| *B60L 1/00* | (2006.01) |
| *B60L 11/18* | (2006.01) |
| *B60W 20/00* | (2016.01) |
| *H01M 8/00* | (2016.01) |
| *B60W 10/28* | (2006.01) |
| *F02N 11/08* | (2006.01) |
| *H01M 16/00* | (2006.01) |
| *B60L 3/00* | (2006.01) |

(52) U.S. Cl.
CPC ............. *B60L 11/18* (2013.01); *B60L 3/0046* (2013.01); *B60L 3/0053* (2013.01); *B60L 11/1885* (2013.01); *B60L 11/1887* (2013.01); *B60W 10/28* (2013.01); *B60W 20/00* (2013.01); *F02N 11/0866* (2013.01); *H01M 8/00* (2013.01); *H01M 16/003* (2013.01); *Y02T 90/34* (2013.01)

(58) Field of Classification Search
CPC ...... B60L 11/18; B60L 3/0053; B60L 3/0048; B60L 11/1885; B60L 11/1887; Y02T 90/34; F02N 11/0866; H01M 16/003; H01M 8/00; B60W 10/28; B60W 20/00
USPC ........ 307/9.1; 429/13, 429, 433; 180/65.275, 180/65.21
See application file for complete search history.

(56) References Cited

U.S. PATENT DOCUMENTS

| | | | |
|---|---|---|---|
| 2009/0325004 A1* | 12/2009 | Choi | ................ H01M 8/04626 429/431 |
| 2014/0175806 A1* | 6/2014 | Kim | .................... F02N 11/0866 290/38 R |

FOREIGN PATENT DOCUMENTS

| | | |
|---|---|---|
| JP | 2010-004628 A | 1/2010 |
| KR | 10-2008-0086941 A | 9/2008 |

(Continued)

*Primary Examiner* — Arnold Kinkead
(74) *Attorney, Agent, or Firm* — Mintz Levin Cohn Ferris Glovsky and Popeo, P.C.; Peter F. Corless

(57) ABSTRACT

A system and method for emergency starting of a fuel cell vehicle is provided. In particular, a high-voltage converter, a balance of power (BOP), and a controller are included in the system. The high-voltage converter is configured such that one side thereof is connected to a high-voltage battery via a battery switch and the other side thereof is connected in parallel to a plurality of fuel cells. The BOP is connected in parallel to the high-voltage converter and the fuel cells. The controller is configured to control the power supplied from the high-voltage battery to the BOP without conversion by connecting the battery switch upon the failure of the high-voltage converter or high-voltage battery.

11 Claims, 4 Drawing Sheets

(56) References Cited

FOREIGN PATENT DOCUMENTS

| KR | 10-2011-0045426 A | 5/2011 |
| KR | 10-2012-0020686 A | 3/2012 |
| KR | 10-2012-0073039 A | 7/2012 |

\* cited by examiner

SYSTEM AND METHOD FOR EMERGENCY STARTING OF FUEL CELL VEHICLE

CROSS-REFERENCE TO RELATED APPLICATION

This application claims priority to and the benefit of Korean Patent Application No. 10-2013-0067698 filed in the Korean Intellectual Property Office on Jun. 13, 2013, the entire contents of which are incorporated herein by reference.

BACKGROUND OF THE INVENTION

1. Field of the Invention

The present invention relates generally to a system and method for the emergency starting of a fuel cell vehicle that, when fuel cells are in a non-generation state and simultaneously a high-voltage battery fails during normal operation, the fuel cell vehicle enters an emergency fuel cell generation mode in order to force the fuel cells to operate in place of the failed high voltage battery.

2. Description of the Related Art

In a fuel cell hybrid vehicle, particularly a system using fuel cells as a main power source, a fuel battery should be in a normal generation state in order to ensure that the vehicle is operating properly. However, in some fuel cell vehicles, there are situations in which power must be supplied to a vehicle load using only a high-voltage battery (e.g., during idling, during starting, and emergency Electric Vehicle (EV) mode operation), in which case if the high-voltage battery fails to operate as designed, it is impossible for the vehicle to be started or operated.

Furthermore, when the starting of fuel cell vehicle using a high-voltage battery fails, some systems provide emergency starting systems which operate via a power converter that converts a low voltage (e.g., 12V) into a higher voltage. Accordingly, a low voltage DC-DC converter (LDC) is required to convert a high voltage into a low voltage and then charge the battery at e.g., 12 V. In order to apply this type of technology, problems arise in that the LDC must be designed in a bidirectional manner so that it can convert a low voltage into a high voltage and a separate power conversion device suitable for this emergency starting is required. Additionally, high voltage circuits in the vehicle must be redesigned in order to accommodate this system.

The above description of the background technology is intended merely to improve an understanding of the background of the present invention, but should not be construed as recognizing that the above-described technologies correspond to conventional technologies that are known to those having ordinary knowledge in the technical filed to which the present invention pertains.

SUMMARY OF THE INVENTION

Accordingly, the present invention has been made keeping in mind the above problems occurring in the prior art, and an object of the present invention is to provide a system and method for the emergency starting of a fuel cell vehicle that, when fuel cells are in a non-generation state and simultaneously a high-voltage battery fails, an emergency fuel cell generation mode is initiated so that the vehicle can be started and operated in a fuel cell only state.

According to an aspect of the present invention, there is provided a system for emergency starting of a fuel cell vehicle, including a high-voltage converter configured so that one side thereof is connected to a high-voltage battery via a battery switch and configured to convert a higher voltage to a lower voltage. The other side of the high voltage converter is connected in parallel to fuel cells. Additionally, a balance of power (BOP) (e.g., an air blower) is connected in parallel to the high-voltage converter and the fuel cells, and a controller is configured to control the power from the high-voltage battery that is supplied to the BOP without conversion by connecting the battery switch upon detecting a failure of the high-voltage converter or high-voltage battery. Furthermore, the controller may also be configured to control the RPM of the air blower in proportion to the voltage of a high-voltage battery that is applied to the air blower.

For example, when the high-voltage converter or high-voltage battery fails during idle stop of the fuel cells, the controller may maintain the connection of the battery switch, stop the operation of the high-voltage converter, and release the idle stop, thereby performing control so that the power of the high-voltage battery is supplied to the BOP without conversion. Further, once the vehicle fuel cells are operating, the controller may release the connection of the battery switch, and the vehicle may then be operated solely in a fuel cell mode that does not rely on power from a high voltage power source (such as a battery).

Before the starting of the fuel cells is completed, the controller may be configured to not operate auxiliary units other than the BOP.

When the high-voltage converter or high-voltage battery fails during starting, the controller may maintain a connection via the battery switch, stop operation of the high-voltage converter, and continue the starting process, thereby performing control so that the power of the high-voltage battery is still supplied to the BOP without conversion.

In some embodiments of the present invention, when the high-voltage converter is operating as designed, the controller may not stop operation of the high-voltage converter, and perform control so that the high-voltage converter has an output voltage equal to an open-circuit voltage (OCV) of the fuel cells.

Additionally, in some embodiments of the present invention, when the high-voltage converter or high-voltage battery fails during EV mode driving, the controller may maintain the connection of the battery switch, eliminate the voltage of the fuel cells by performing a process of stopping generation of the fuel cells, and operate the BOP.

Also when the high-voltage battery fails during an EV mode operation, the controller may maintain a connection via the battery switch, adjust an output voltage of the high-voltage converter to an OCV of the fuel cells, and then operate the BOP accordingly.

Even further, in some exemplary embodiments of the present invention, when a SOC (state of charge) of the high-voltage battery is lower than a preset minimum SOC during EV mode operation, the controller may also be configured to maintain a connection via the battery switch, adjust an output voltage of the high-voltage converter to an OCV of the fuel cells, and then operate the BOP.

According to another aspect of the present invention, there is provided a method for emergency starting of a fuel cell vehicle, including determining, by the controller, whether a high-voltage converter or a high-voltage battery has failed; connecting a battery switch between the high-voltage converter and the high-voltage battery when the high-voltage converter or high-voltage battery is determined to have failed; stopping, by the controller, operation of the high-voltage converter; and supplying power from the high-voltage battery to the BOP without conversion.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
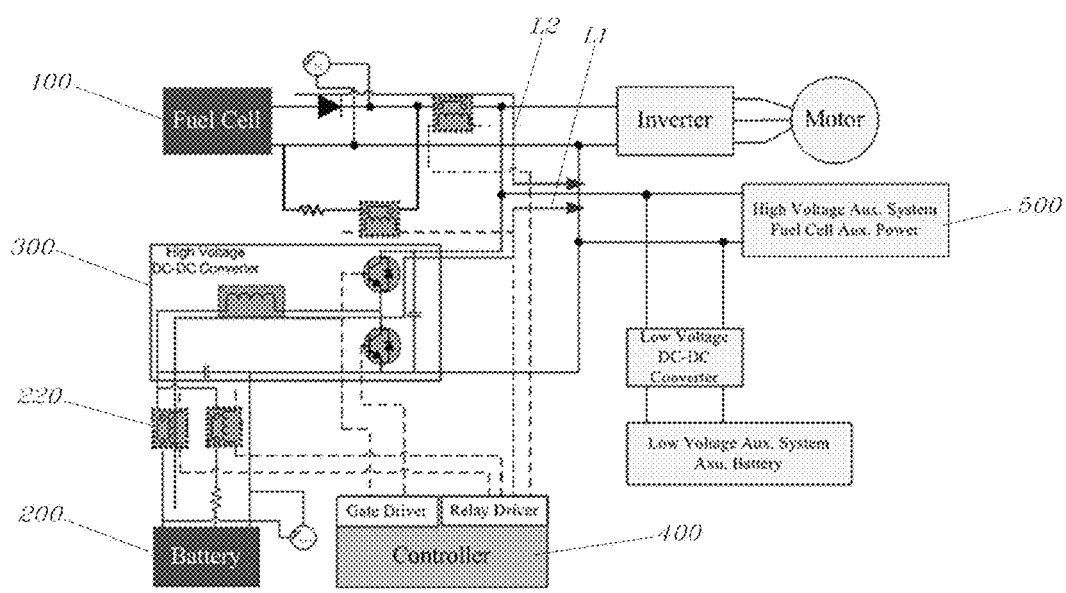
FIG. 1 is a diagram illustrating the configuration of a system for the emergency starting of a fuel cell vehicle according to an exemplary embodiment of the present invention.

Reference should now be made to the drawings, throughout which the same reference numerals are used to designate the same or similar components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods/processes are executed by at least one controller. The tem controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A system and method for the emergency starting of a fuel cell vehicle according to an exemplary embodiment of the present invention will be described in detail below with reference to the accompanying drawings.

Figure 2:
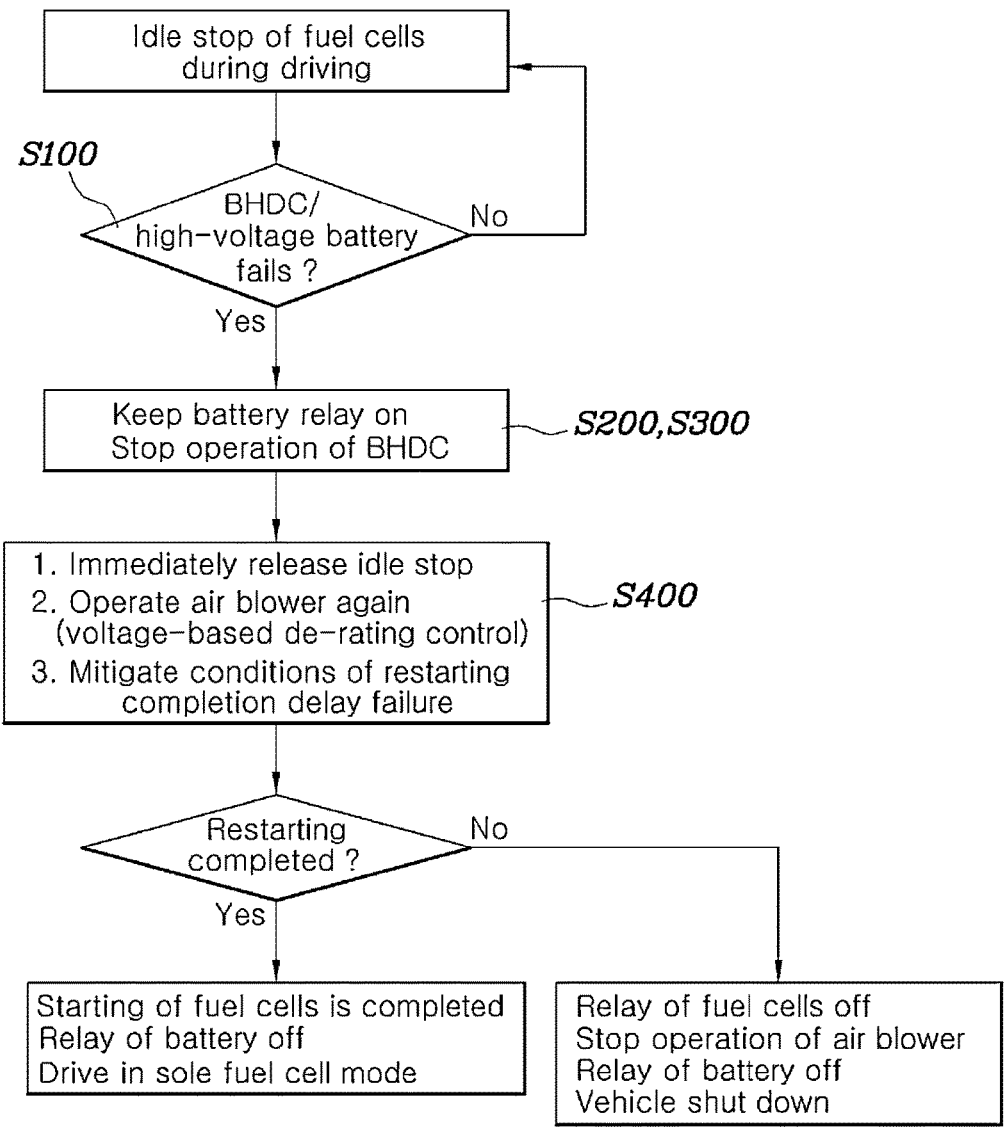
FIGS. 2 to 4 are flowcharts illustrating a system and method for the emergency starting of a fuel cell vehicle according to exemplary embodiments of the present invention.
Figure 3:
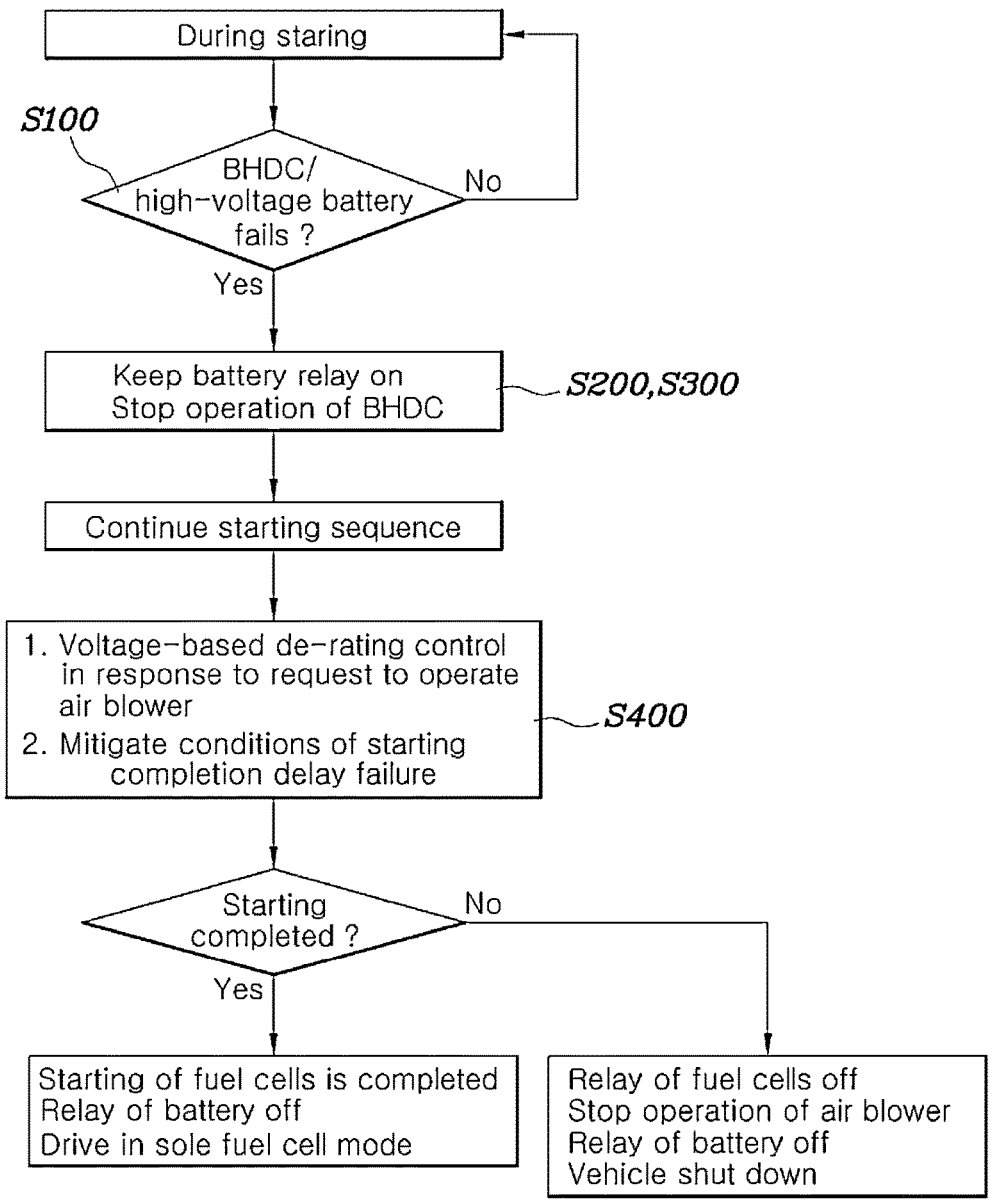
Figure 4:
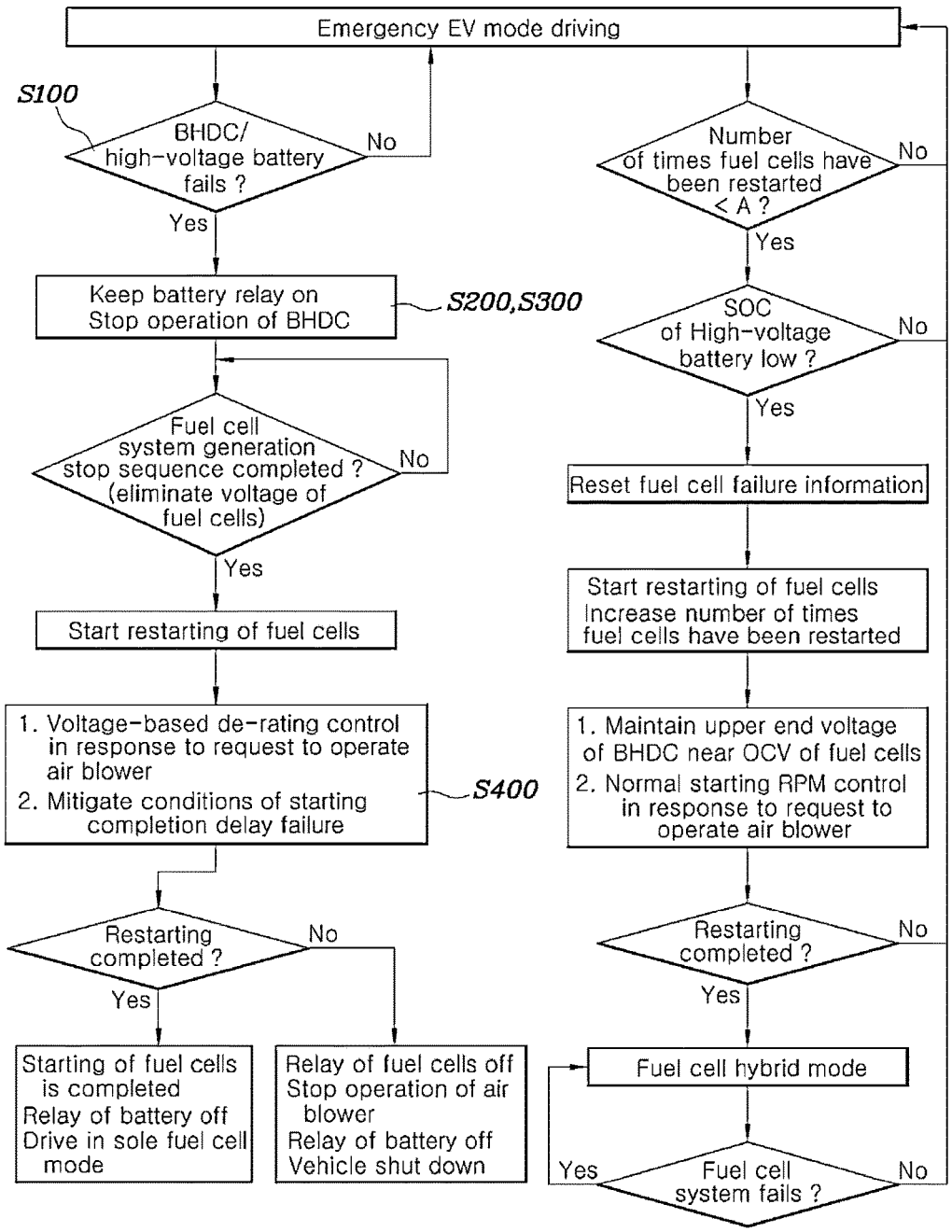

FIG. 1 is a diagram illustrating the configuration of a system for the emergency starting of a fuel cell vehicle according to an exemplary embodiment of the present invention, and FIGS. 2 to 4 are flowcharts illustrating a system and method for the emergency starting of a fuel cell vehicle according to exemplary embodiments of the present invention.

The system for the emergency starting of a fuel cell vehicle according to the present invention includes a high-voltage converter 300 configured so that one side thereof is connected to a high-voltage battery 200 via a battery switch 220 and the other side thereof is connected in parallel to fuel cells 100. Additionally, a BOP 500 is connected in parallel to the high-voltage converter 300 and the fuel cells 100, and a controller 400 is configured to control the battery switch so that power from the high-voltage battery 200 can be supplied to the BOP 500 without conversion of the voltage from the battery to a lower voltage by operating the battery switch 220 upon failure of the high-voltage converter 300 or high-voltage battery 200.

FIG. 1 illustrates a schematic circuit diagram of the system for the emergency starting of a fuel cell vehicle. The fuel cells 100, the high-voltage converter 300, an inverter, a high-voltage component, and a low-voltage converter are all connected in parallel. Furthermore, the high-voltage battery 200 is connected to the high-voltage converter 300. During a starting sequence, the high-voltage battery 200 is connected (i.e., the battery switch 220 is connected after the voltage of the main bus terminal has been pre-charged via a resistance by the operation of a relay), boosting to a higher voltage (e.g., near the OCV of the fuel cells) is performed via the high-voltage converter 300, a fuel cell relay is connected, and the voltage of the fuel cells 100 is increased by operating the BOP, thereby starting the vehicle. It will be apparent that the connection of the battery switch 200 includes maintaining a connection when the battery switch 220 has been connected before the performance of this control.

The BOP 500 that is used to increase the voltage of the fuel cells to generate power includes an air blower, a hydrogen supply valve, a cooling pump, etc. The air blower and the cooling pump are units that are operated using a high voltage (e.g., about 100V to 450V), and the air blower should be essentially operated to increase voltage being output from the fuel cells. Accordingly, to perform starting, it is necessary to maintain high voltage via the battery, and the normal operation of the high-voltage converter 300 and the high-voltage battery 200 should be ensured.

Separately, to increase fuel efficiency and prevent a low-humidification stack state, low-output interval fuel cell idle stop driving is required while driving, in which case the fuel cells do not generate power because the air blower of the fuel cells has stopped, and only the high-voltage battery 200 is supplying power to the vehicle load.

When a serious problem occurs in a fuel cell system, the generation of the fuel cells may be stopped and the vehicle may be run in an emergency EV mode in which the vehicle is run using only the high-voltage battery 200. Even in this case, to run the vehicle with limited output, the normal operation of the high-voltage battery 200 and the high-voltage converter 300 must be ensured.

In a driving state in which the normal operations of the high-voltage converter 300 and the high-voltage battery 200 are required, when a corresponding part fails or the operation thereof is impossible, it is necessary to cause the fuel cell system to forcibly enter an emergency mode and to perform operation solely in a fuel cell mode in order to allow the vehicle to be operated at least to the nearest repair facility.

For this purpose, the high-voltage converter 300 is configured such that one side thereof is connected to the high-voltage battery 200 via the battery switch 220 and the other side thereof is connected in parallel to the fuel cells 100, and the BOP 500 is connected in parallel to the high-voltage converter 300 and the fuel cells 100. Furthermore, the controller 400 performs a connection to the battery switch 220 when the high-voltage converter 300 or high-voltage battery 200 fails, thereby allowing power to be supplied to the BOP 500 without converting the high-voltage battery 200. Furthermore, an element of the BOP 500 that is essential to the starting of the fuel cells may be the air blower.

That is, when the high-voltage converter 300 or high-voltage battery 200 fails, the battery switch is connected so that the battery voltage can be directly connected to the air blower via an L1 path. Depending on the generation state of the fuel cells, the air blower may be operated using the voltage of the fuel cells (an L2 path) if the voltage of the fuel cells is higher than the battery voltage, and the air blower may be operated using the battery voltage (an L1 path) if the voltage of the fuel cells is lower than the battery voltage.

In this case, the air blower performs voltage-based de-rating control. That is, the controller 400 may control the RPM of the air blower in proportion to the voltage of the high-voltage battery 200 in such a way so as to increase the RPM when the voltage applied to the air blower is above a threshold value and decrease the RPM when the voltage is below the threshold value.

That is, to enable the generation of the fuel cell system, the air blower, that is, the essential element of the BOP, is directly operated via the battery switch 220 of the high-voltage battery or the air blower is operated using the output of the fuel cells depending on the state of the generation of the fuel cells. In this case, since the air blower should be operated at a voltage below a normal voltage range (for example, in a range of 250 to 450 V), the RPM of the air blower is reduced to a minimum value if the voltage is below the threshold (for example, a minimum of 100 V), and the air flower is slowly operated within a voltage range that allows the fuel cells to be started. In this case, even when a problem with the high-voltage battery occurs, the battery switch is kept on for a specific period of time.

More specifically, FIG. 2 illustrates what happens when the vehicle is "idling" during the operation of fuel cells. In this case, upon the failure of the high-voltage converter or high-voltage battery while in an idle stop, the controller maintains a connection with the operational components via operation of the battery switch, stops the operation of the high-voltage converter, and releases the idle stop, thereby supplying power from the high-voltage battery to the BOP without conversion of the voltage. Furthermore, once the starting of the fuel cells has been completed, the controller releases the connection of the battery switch, and operates the vehicle solely in a fuel cell mode.

Meanwhile, the controller may not operate the remaining auxiliary units other than the BOP until the starting of the fuel cells is completed. Furthermore, when the high-voltage converter is operating as designed, the controller may control the high-voltage converter without stopping the operation thereof so that it has an output voltage approximate to the open-circuit voltage OCV of the fuel cells.

Referring to FIGS. 2 to 4, a method for the emergency starting of a fuel cell vehicle according to the present invention includes step S100 of determining, by the controller, whether the high-voltage converter or high-voltage battery has failed; step S200 of connecting/operating, by the controller, the battery switch between the high-voltage converter and the high-voltage battery when the high-voltage converter or high-voltage battery has failed; step S300 of stopping the operation of the high-voltage converter; and step S400 of supplying the power from the high-voltage battery to the BOP without conversion.

FIG. 2 illustrates the case of a failure during idle stop, which corresponds to a forcible fuel cell emergency starting sequence that is performed when the high-voltage converter or high-voltage battery fails during the idle stop of the fuel cells while the vehicle is being operated. Upon air blower voltage-based de-rating control, the voltage of the high-voltage battery and the fuel cells is used as a power source for operation, and operation is performed in a situation in which the minimum voltage (e.g., 100V) has been ensured as the battery voltage because the voltage of the fuel cells is variable depending on the quantity of supply of air.

In the case of mitigation of restarting completion delay failure conditions, the air blower is minimally operated in a low voltage state (e.g., below 100V) other than a normal starting state, and thus a voltage rise and stabilization time may be increased. Accordingly, a starting failure is prevented from being erroneously determined by mitigating starting completion conditions. In the mitigation of starting completion conditions, the maximum allowable time of the battery relay ON is taken into account.

Other auxiliary BOP-related units that are used to operate the fuel cells are operated after the starting of the fuel battery has been completed. Until the starting of the fuel cells is completed, the motor and other auxiliary high-voltage units other than the air blower are not used in order to conserve energy.

Unlike in the previous embodiment, when only the battery fails (the high-voltage converter is normal), the high-voltage converter may not be stopped but may be operated. Like during normal starting, it may be possible to start the fuel cells while maintaining the voltage of the bus terminal at a voltage near the OCV of the fuel cells. As such, it will be apparent that the connection of the battery switch includes maintaining a connection when the battery switch has been connected before the performance of this control.

Meanwhile, FIG. 3 illustrates the case of the failure of the battery or converter during starting. When the high-voltage converter or high-voltage battery fails during starting, the controller maintains the connection of the battery switch, stops the operation of the high-voltage converter, and continues the starting process, thereby performing control so that the power of the high-voltage battery is supplied to the BOP without conversion thereof.

That is, the case during starting is similar to a control sequence for idle stop. Thus, generation has been completely stopped while starting. When the high voltage converter/high-voltage battery fails, the existing starting sequence is continuously performed, and operates the air blower by directly connecting the high-voltage battery at the time at which the operation of the air blower is requested.

Since the generation of the fuel cells is not completely stopped and the fuel cells are in a state of waiting for generation again during the idle stop of the fuel cells (e.g., the relay of the fuel cells is kept ON, the supply of hydrogen is maintained, and the air blower and other auxiliary units are stopped), generation should be resumed by operating the air blower immediately after the failure of the high-voltage converter or high-voltage battery.

FIG. 4 illustrates the case of a failure in EV mode, in which case, when the high-voltage converter or high-voltage battery fails during EV mode driving, the controller may maintain the connection of the battery switch, remove the voltage of the fuel cells by performing a process of stopping the generation of the fuel cells, and then operate the BOP (illustrated value A is a fuel cell restarting allowance reference value that is related to the low SOC during emergency EV mode driving).

FIG. 4 is a flowchart illustrating the control of the emergency starting of the fuel cells, when the high-voltage converter or high-voltage battery fails during emergency EV mode driving, or when the high-voltage converter or high-voltage battery does not fail but emergency EV driving for a long time is impossible because of lack of SOC.

The case in which the high-voltage converter or high-voltage battery fails during emergency EV mode driving is the same as the case of the foregoing starting, but the stopping of the generation of the fuel cells should be determined before the restarting of the fuel battery.

If the restarting of the fuel cells is initiated when the stopping of the generation of the fuel cells is not completed, the high voltage component of a main bus terminal may be damaged upon the connection of the main relay of the fuel cells, and a stack may be damaged because of an increase in the instantaneous current of the fuel cells (a hydrogen supply non-preparation state). The reason for this is that the remaining high voltage of the fuel cells may be higher than the voltage of the battery at the main bus terminal. It will be apparent that when the high-voltage converter can be continuously operated, the process of determining the stopping of generation may be omitted and then restarting may be immediately performed. The reason for this is that the voltage of the bus terminal may be caused to approximate the OCV of the fuel cells by the voltage control of the high-voltage converter.

Meanwhile, if the high-voltage converter is normal but the high-voltage battery fails, the controller may connect the battery switch of the high-voltage battery during EV mode driving, perform control so that the output voltage of the high-voltage converter is adjusted to the open-circuit voltage OCV of the fuel cells, and then operate the BOP, thereby preventing damage attributable to the remaining voltage of the fuel cells.

Furthermore, if the SOC of the high-voltage battery is lower than a preset minimum SOC during EV mode driving, the controller may connect the battery switch, perform control so that the output voltage of the high-voltage converter is adjusted to the open-circuit voltage OCV of the fuel cells, and then operate the BOP. The minimum SOC is the SOC at which some emergency driving can be performed only by emergency EV driving. If the SOC is lower than the minimum SOC, it is necessary to drive a vehicle by performing the emergency starting of the fuel cells. Accordingly, in this case, the emergency starting of the fuel cells may be performed by connecting the battery switch, performing control so that the output voltage of the high-voltage converter is adjusted to the open-circuit voltage OCV of the fuel cells and then operating the BOP. Furthermore, upon requesting the operation of the air blower in order to perform starting, the air blower is caused to operate at a normal RPM.

If the SOC of the battery is insufficient in an emergency EV mode as described above, information about the failure of the fuel cell system is reset and the fuel cells may be restarted. In this case, the number of times restarting is performed is increased and this information is used to limit the number of times restarting can be performed. Since this case is not a case in which the high-voltage converter or high-voltage battery fails, the voltage of the bus terminal is normally maintained at a voltage approximate to the OCV of the fuel cells, the main relay of the fuel cells is connected, and the sequence of the normal starting of hydrogen/oxygen supply is started. The air blower is also operated at an optimum RPM required for starting without voltage de-rating. Once the fuel cells have been successfully restarted driving is performed in a fuel cell hybrid mode, and the insufficient SOC is compensated for by the charging of the fuel cells, thereby enabling operation of the vehicle.

In accordance with the above-described system and method for the emergency starting of a fuel cell vehicle, the inability to shut down and start the vehicle during operation can be prevented, thereby enhancing the reliability of driving and safety of a fuel cell vehicle.

Furthermore, the reliability of driving of a fuel cell vehicle can be ensured using only control software without requiring an additional emergency starting device or an improvement of hardware, and thus the performance of the vehicle can be improved without additional cost. Moreover, accidental staffing of a vehicle and inability to start the vehicle are prevented, and thus driver discomfort and security are increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for emergency starting of a fuel cell vehicle, comprising:
  a voltage converter configured such that one side thereof is connected to a high-voltage battery via a battery switch and a remaining side thereof is connected in parallel to a plurality of fuel cells;
  a balance of power (BOP) connected in parallel to the voltage converter and the fuel cells, wherein the BOP is at least one of high voltage auxiliary units and the fuel cells generate electric power when the BOP operates; and
  a controller configured to control the supply of power from the high-voltage battery to the BOP without conversion of the voltage converter by connecting the battery switch upon a failure of the voltage converter or high-voltage battery,
  wherein the BOP is an air blower and the controller controls a revolutions per minute of the air blower in proportion to a voltage of a high-voltage battery that is applied to the air blower.

2. The system of claim 1, wherein the controller, when the voltage converter or high-voltage battery fails during idle stop of the fuel cells, maintains the connection of the battery switch, stops operation of the voltage converter, and releases the idle stop, thereby performing control so that the power of the high-voltage battery is supplied to the BOP without conversion.

3. The system of claim 2, wherein the controller, when the starting of the plurality of fuel cells is completed, releases the connection of the battery switch and operates the vehicle solely in a fuel cell mode.

4. The system of claim 2, wherein the controller, before starting of the plurality of fuel cells is completed, does not operate any auxiliary units other than the BOP.

5. The system of claim 1, wherein the controller, when the voltage converter or high-voltage battery fails during starting, maintains the connection of the battery switch, stops operation of the high-voltage converter, and continues a starting process, thereby performing control so that the power of the high-voltage battery is supplied to the BOP without conversion.

6. The system of claim 5, wherein the controller, when the voltage converter is operating normally and the high voltage battery has failed, does not stop operation of the high-voltage converter, and performs control so that the voltage converter has an output voltage equal to an open-circuit voltage (OCV) of the fuel cells.

7. The system of claim 1, wherein the controller, when the voltage converter or high-voltage battery fails during EV mode operation, maintains the connection of the battery switch, eliminates a voltage from the fuel cells by performing a process of stopping generation of the fuel cells, and operates the BOP.

8. The system of claim 1, wherein the controller, when the high-voltage battery fails during EV mode operation, maintains the connection of the battery switch, adjusts an output voltage of the voltage converter to an open-circuit voltage (OCV) of the fuel cells, and then operates the BOP.

9. The system of claim 1, wherein the controller, when a SOC (state of charge) of the high-voltage battery is lower than a preset minimum SOC during EV mode operation, maintains the connection of the battery switch, adjusts an output voltage of the high-voltage converter to an OCV of the fuel cells, and then operates the BOP.

10. A method for emergency starting of a fuel cell vehicle, comprising:
   determining, by a controller, whether a high-voltage converter or a high-voltage battery has failed;
   connecting, by the controller, a battery switch between the high-voltage converter and the high-voltage battery when the high-voltage converter or high-voltage battery has failed;
   stopping, by the controller, operation of the high-voltage converter; and
   supplying power from the high-voltage battery to a balance of power (BOP) without conversion of the high-voltage converter in response to connecting the battery switch,
   wherein the BOP is connected in parallel to the voltage converter and the fuel cells and is at least one of high voltage auxiliary units, and the fuel cells generate electric power when the BOP operates,
   wherein the BOP is an air blower, and
   wherein, in the supplying step, the controller controls a revolution per minute of the air blower in proportion to a voltage of a high-voltage battery that is applied to the air blower.

11. A non-transitory computer readable medium containing program instructions executed by a controller, the non-transitory computer readable medium comprising:
   program instructions that determine whether a high-voltage converter or a high-voltage battery has failed;
   program instructions that connect a battery switch between the high-voltage converter and the high-voltage battery when the high-voltage converter or high-voltage battery has failed;
   program instructions that stop operation of the high-voltage converter; and
   program instructions that control power supplied from the high-voltage battery to a balance of power (BOP) without conversion of the high-voltage converter in response to connecting the battery switch,
   wherein the BOP is connected in parallel to the voltage converter and the fuel cells and is at least one of high voltage auxiliary units, and the fuel cells generate electric power when the BOP operates,
   wherein the BOP is an air blower, and
   wherein the program instructions that control power comprises program instructions that control a revolution per minute of the air blower in proportion to a voltage of a high-voltage battery that is applied to the air blower.

* * * * *